US009660867B2

(12) United States Patent
Handa et al.

(10) Patent No.: US 9,660,867 B2
(45) Date of Patent: May 23, 2017

(54) COMMUNICATION MANAGEMENT PROGRAM AND CLIENT APPARATUS

(71) Applicants: KABUSHIKI KAISHA TOSHIBA, Minato-ku (JP); TOSHIBA SOLUTIONS CORPORATION, Kawasaki-shi (JP)

(72) Inventors: Yuichi Handa, Fuchu (JP); Seiichiro Tanaka, Koshigaya (JP); Minoru Saito, Fuchu (JP); Kazuya Hashimoto, Fuchu (JP); Daisuke Maeno, Fuchu (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 468 days.

(21) Appl. No.: 14/478,306

(22) Filed: Sep. 5, 2014

(65) Prior Publication Data

US 2014/0379787 A1    Dec. 25, 2014

Related U.S. Application Data

(63) Continuation of application No. PCT/JP2012/074731, filed on Sep. 26, 2012.

(30) Foreign Application Priority Data

Mar. 21, 2012  (JP) ................. 2012-063818

(51) Int. Cl.
*G06F 15/16*  (2006.01)
*H04L 12/24*  (2006.01)
(Continued)

(52) U.S. Cl.
CPC ............ *H04L 41/14* (2013.01); *G06F 9/54* (2013.01); *H04L 67/42* (2013.01); *H04L 67/28* (2013.01)

(58) Field of Classification Search
CPC ......... H04L 41/14; H04L 67/42; H04L 67/28; G06F 9/54
See application file for complete search history.

(56) References Cited

U.S. PATENT DOCUMENTS 6,393,494 B1  5/2002 Hyder et al.
2006/0004927 A1* 1/2006 Rehman ............ G06F 17/30861
709/250

(Continued)

FOREIGN PATENT DOCUMENTS

CN  1902590 A  1/2007
JP  9-146768 A  6/1997

(Continued)

OTHER PUBLICATIONS

International Search Report issued on Oct. 30, 2012 for PCT/JP2012/074731 filed on Sep. 26, 2012 with English Translation.

(Continued)

*Primary Examiner* — John Macilwinen
(74) *Attorney, Agent, or Firm* — Oblon, McClelland, Maier & Neustadt, L.L.P.

(57) ABSTRACT

A client apparatus according to an embodiment includes a communication mode setup device, a communication pattern determination device, and a communication execution device. The communication mode setup device sets up an operation mode for executing the communication process in accordance with the individual process or a test mode for executing the substitute process. The communication pattern determination device determines a predetermined communication pattern name representative of a local pattern if the test mode is set up. The communication execution device acquires from the communication pattern management device communication component names and an order asso- (Continued)

ciated with the determined communication pattern name, and executes communication components in order.

2 Claims, 9 Drawing Sheets

(51) Int. Cl.
    *G06F 9/54*       (2006.01)
    *H04L 29/06*    (2006.01)
    *H04L 29/08*    (2006.01)

(56) References Cited

U.S. PATENT DOCUMENTS

2007/0147277 A1    6/2007   Caromel et al.
2009/0287772 A1*  11/2009  Stone ...................... G06F 9/547
                                                                709/203

FOREIGN PATENT DOCUMENTS

| | | |
|---|---|---|
| JP | 2004-152122 A | 5/2004 |
| JP | 2006-24188 A | 1/2006 |
| JP | 2009-200864 A | 9/2009 |

OTHER PUBLICATIONS

International Written Opinion mailed on Oct. 30, 2012 for PCT/JP2012/074731 filed on Sep. 26, 2012.
International Preliminary Report on Patentability and Written Opinion issued Oct. 2, 2014, in International Application No. PCT/JP2012/074731 (English translation only).
Combined Chinese Office Action and Search Report issued Nov. 22, 2016 in Chinese Patent Application No. 201280070076.0 (with English language translation).

\* cited by examiner

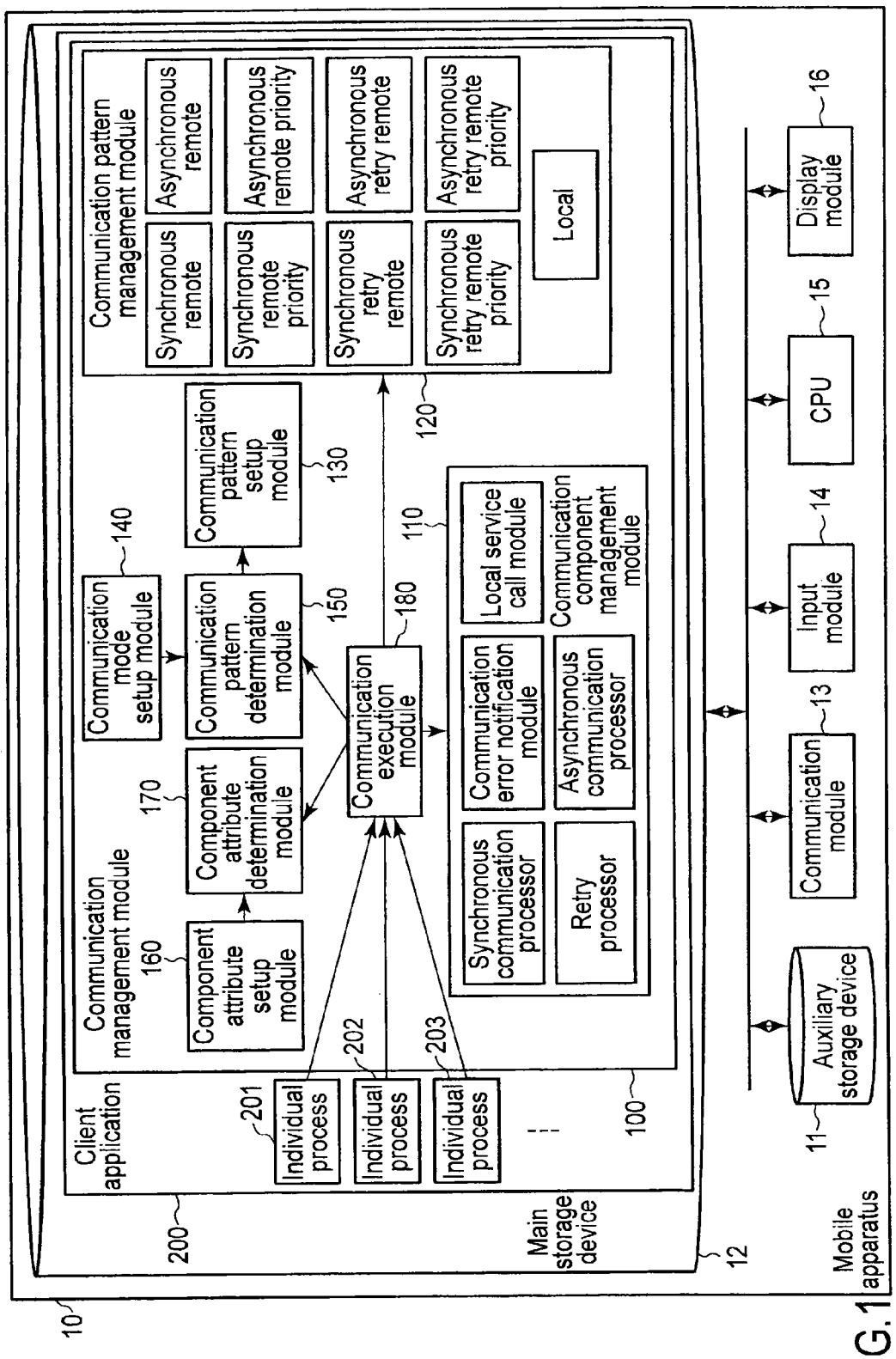
F I G. 1

| Communication component name | Attribute | (Description) |
|---|---|---|
| Synchronous communication processor | • Execution service name | Transmit request for executing service to server application, and stand by until receiving response |
| Asynchronous communication processor | • Execution service name | Transmit request for executing service to server application, without waiting for response |
| Retry processor | • Retry number<br>• Retry interval | Retransmit (retry) request in case of communication error<br>Number of times of retry and interval of retries can be set |
| Communication error notification module | • Error message notification method<br>• Error message | Notify user of occurrence of communication error in case of communication error<br>Error notification method ("dialog display", "display at arbitrary location on screen") and message (e.g., "communication failed") can be set |
| Local service call module | — | Execute service of same name as client application without executing communication, instead of executing service of server application by executing communication |

F I G. 2

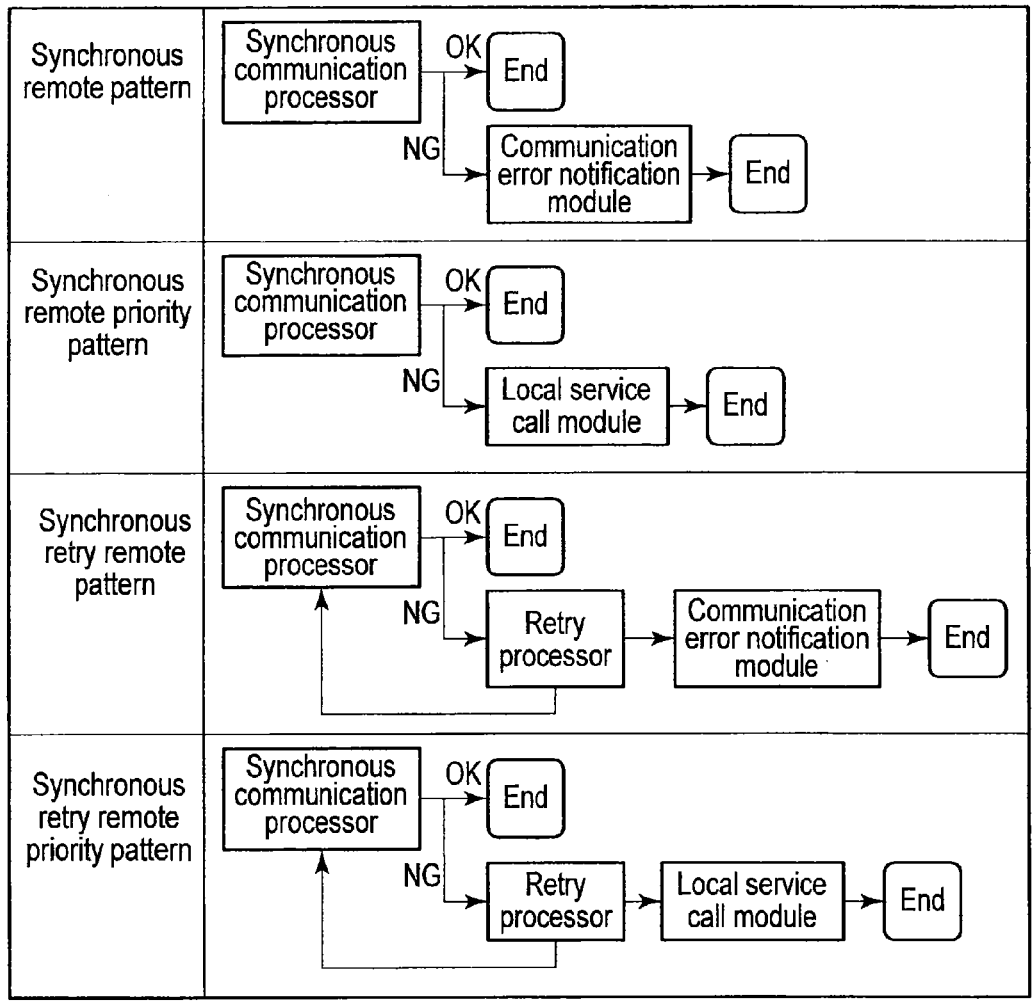
F I G. 3

| Communication pattern name | Order | Communication component name |
|---|---|---|
| Synchronous remote pattern | 1 | Synchronous communication processor |
| | 2 | Communication error notification module |
| Synchronous remote priority pattern | 1 | Synchronous communication processor |
| | 2 | Local service call module |
| Synchronous retry remote pattern | 1 | Synchronous communication processor |
| | 2 | Retry processor |
| | 3 | Communication error notification module |
| Synchronous retry remote priority pattern | 1 | Synchronous communication processor |
| | 2 | Retry processor |
| | 3 | Local service call module |
| Asynchronous remote pattern | 1 | Asynchronous communication processor |
| | 2 | Communication error notification module |
| Asynchronous remote priority pattern | 1 | Asynchronous communication processor |
| | 2 | Local service call module |
| Asynchronous retry remote pattern | 1 | Asynchronous communication processor |
| | 2 | Retry processor |
| | 3 | Communication error notification module |
| Asynchronous retry remote priority pattern | 1 | Asynchronous communication processor |
| | 2 | Retry processor |
| | 3 | Local service call module |
| Local pattern | 1 | Local service call module |
| Communication pattern management module | | |

~120

F I G. 5

| Communication component name | Setup kind | Process name | Attribute |
|---|---|---|---|
| Synchronous communication processor | Initial setup | | execution service name=DefaultService |
| | Individual setup | Search process | execution service name=SearchService |
| Retry processor | Initial setup | | retry number=2, retry interval=2 seconds |
| | Individual setup | Search process | retry number=5 |
| Communication error notification module | Initial setup | | error notification method=Dialog, error message=ConnectionError! |
| | Individual setup | | |

Component attribute setup module

COMMUNICATION MANAGEMENT PROGRAM AND CLIENT APPARATUS

CROSS-REFERENCE TO RELATED APPLICATIONS

This is a Continuation application of PCT application No. PCT/JP2012/074731, filed on Sep. 26, 2012, which was published under PCT Article 21(2) in Japanese.

This application is based upon and claims the benefit of priority from Japanese Patent Application No. 2012-063818, filed on Mar. 21, 2012; the entire contents of which are incorporated herein by reference.

FIELD

Embodiments described herein relate generally to a communication management program and a client apparatus.

BACKGROUND

In recent years, in client-server systems, there have been an increasing number of situations in which a mobile apparatus, such as a smartphone or a tablet PC (Personal Computer), in which a client application is provided, is used as a client apparatus.

In such a system using the mobile apparatus, unlike a situation in which a PC that is connected to a wired LAN (Local Area Network) is used as a client apparatus, there are many cases in which communication is disabled in places where connection by radio waves is difficult. In preparation for such a case that communication is disabled, it is necessary for a system developer (hereinafter referred to as "developer") to implement an offline process such as a retry process of communication, or a display process of a communication error screen.

However, for an individual developer to implement such offline process is disadvantageous in that the productivity deteriorates and the quality degrades in a case where the developer is insufficiently skilled. In addition, in general, in a client-server system, there is such a disadvantage that the operation confirmation of a client application cannot be executed in a state in which a server application, which is a communication counterpart, is absent.

From the standpoint of resolving the above disadvantages, there has been proposed a method in which a cache is used in a case of being offline at a time of communication. However, this method is a communication method that cannot be chosen from other communication processes such as a retry process and a display process of a communication error screen.

Further, in order to execute the operation confirmation of the client application in a state in which a server application is absent, a scheme is necessary for effecting switching from an operation mode to a test mode by partial setup alone, without altering the source code of the system.

As a conventional technique for this mode switching, SpringFramework Ver. 3.1, which is open source software, includes a profile function for switching a combination of processes. The profile function is a technique which can be used for the switching of a communication mode. It should be noted, however, that since the profile technique relates to switching, the developer still needs to implement a communication process of an operation mode and a communication process of a test mode. Specifically, the profile technique cannot resolve such disadvantages as degradation in productivity and quality at a time when an individual developer implements an offline process.

A solution to such problem of the present invention is to provide a communication management program and a client apparatus, which can execute operation confirmation of a client application in a state in which a server application is absent, while being able to prevent degradation in productivity and quality, and to switch a communication mode.

BRIEF DESCRIPTION OF THE DRAWINGS

FIG. 1 is a schematic view illustrating a configuration of a mobile apparatus according to an embodiment.

FIG. 2 is a schematic view for explaining examples of communication components in the embodiment.

FIG. 3 is a schematic view illustrating, in a table form, examples of a communication pattern in the embodiment.

FIG. 5 is a schematic view for describing a communication pattern management module in the embodiment.

FIG. 8 is a schematic view for describing a component attribute setup module in the embodiment.

DETAILED DESCRIPTION

Figure 4:
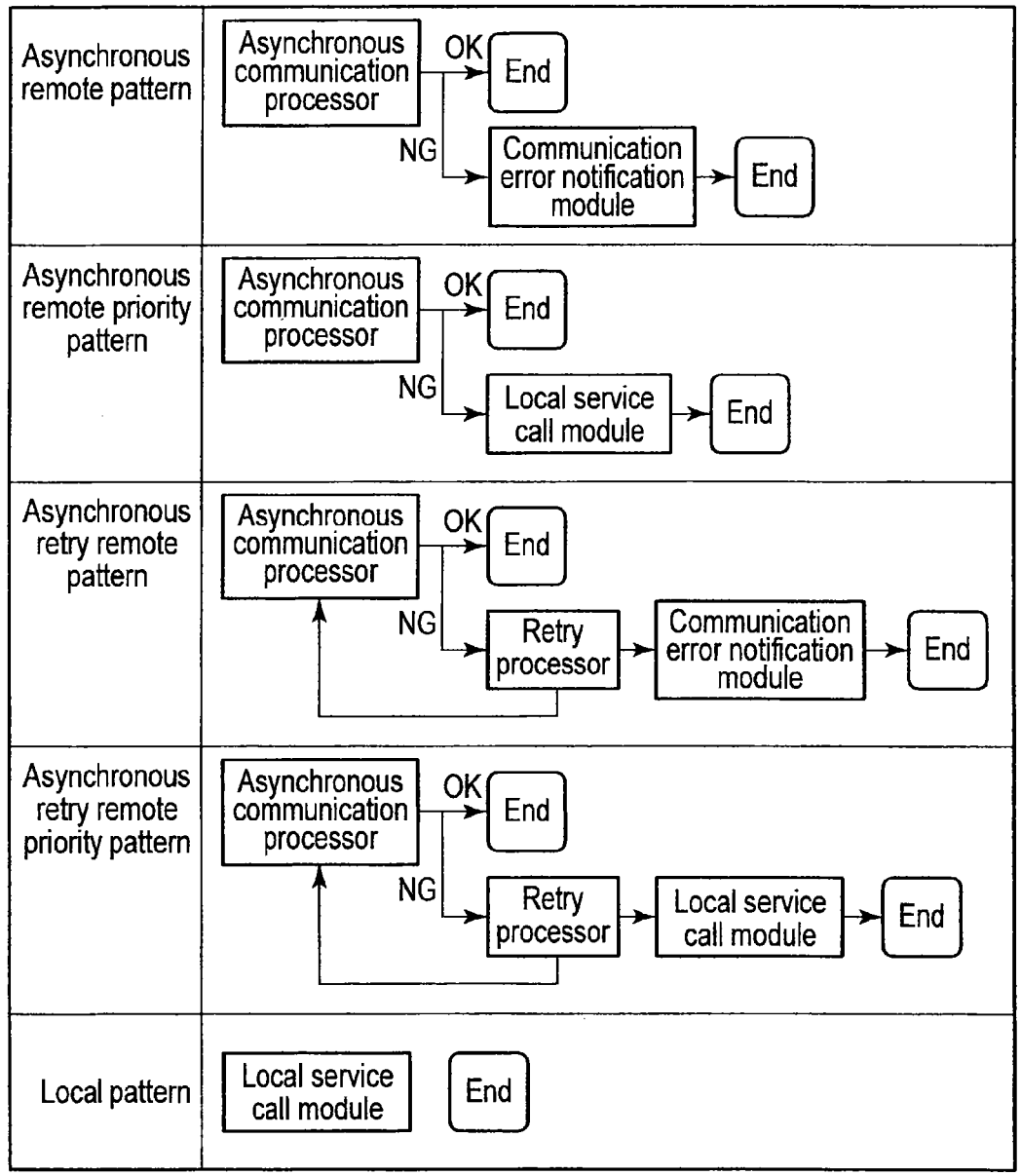
FIG. 4 is a schematic view illustrating, in a table form, examples of the communication pattern in the embodiment.

In general, according to one embodiment, a communication management program is used in a client apparatus, the apparatus including a storage device storing a client application program and a CPU executing the client application program, wherein the communication management program is stored in the storage device and executed by the CPU.

The client application program is an application program for individually executing a plurality of individual processes and a substitute process.

The plurality of individual processes use a communication process in a client-server system composed of the client apparatus capable of executing the communication process by radio and a server apparatus.

The substitute process is a substitute process which is substituted for each of the individual processes and makes no use of the communication process.

The communication management program is a communication management program for causing the client apparatus to function as a communication component management device, a communication pattern management device, a communication pattern setup device, a communication mode setup device, a communication pattern determination device, a component attribute setup device, a component attribute determination device, and a communication execution device.

The communication component management device stores communication components which are distinguishable by communication component names, the communication components including communication components for individually executing one or more partial processes constituting the communication process, and a communication component for calling and executing the substitute process.

The communication pattern management device mutually associates and stores, with respect to each of communication pattern names identifying communication patterns indicative of a combination of the communication components, the communication component name identifying each of the communication components used in the combination and an order of execution of the communication components.

The communication pattern setup device mutually associates and sets up, with respect to each of application names identifying the client application program, a process name identifying the individual process, the communication pattern name and a setup kind identifying initial setup or individual setup.

The communication mode setup device sets up, with respect to each of the application names, an operation mode for executing the communication process in accordance with the individual process or a test mode for executing the substitute process.

The communication pattern determination device determines the communication pattern name identifying the communication pattern to be a predetermined communication pattern name representative of a local pattern if the test mode is set up in the communication mode setup device, and determines the communication pattern name identifying the communication pattern to be the communication pattern name that is set up in communication pattern setup device if the operation mode is set up in the communication mode setup device.

The component attribute setup device mutually associates and sets up, with respect to each of the communication component names, the setup kind, the process name and an attribute indicative of setup of an operation in the partial process.

The component attribute determination device refers to, when the individual process, which is being executed, uses a communication component, the component attribute setup device, based on the communication component name identifying the communication component and the process name identifying the individual process, determines, when the process name associated with the communication component name and the individual setup of the setup kind in the component attribute setup device agrees with the process name identifying the individual process, that the attribute associated with the individual setup is the attribute of the communication component, and determines, in cases other than a case of the agreement, that the attribute associated with the communication component name and the initial setup of the setup kind in the component attribute setup device is the attribute of the communication component.

The communication execution device acquires from the communication pattern management device the communication component names and the order associated with the communication pattern name determined by the communication pattern determination device, acquires the communication components identified by the acquired communication component names from the communication component management device, sets up the attributes determined by the component attribute determination device for the acquired communication components, and executes the communication components, for which the attributes have been set up, in the acquired order.

An embodiment will be described hereinafter with reference to the accompanying drawings. Each of the apparatuses to be described below can be implemented by a hardware configuration, or a combined configuration of hardware resources and software. As the software of the combined configuration, use is made of a program which is preinstalled in a computer of an associated apparatus from a network or a storage medium, in order to realize the functions of the associated apparatus.

To begin with, an outline of the embodiment is given. In the embodiment, a description is given of a case in which, in a client-server system, communication is executed from a mobile apparatus serving as a client apparatus, which executes a client application, to a server apparatus which executes a server application.

By executing the client application, the mobile apparatus executes, in advance, initial setup of communication patterns and component attributes, which are common to individual processes, and executes communication. In addition, as regards an individual process which uses a communication pattern and component attributes, other than the initial setup, at a time of communication, the mobile apparatus executes individual setup of the communication pattern and component attributes, and executes communication. Furthermore, at a time of a test, the mobile apparatus executes a substitute process of the client application without executing communication.

An outline of the embodiment is given above. Next, the embodiment will be described in detail.

Embodiment

FIG. 1 is a schematic view illustrating a configuration of a mobile apparatus according to an embodiment. This mobile apparatus is used as a client apparatus in a client-server system which includes the client apparatus that is capable of executing a communication process by radio, and a server apparatus.

In this case, in the mobile apparatus 10, an auxiliary storage device 11, a main storage device 12, a communication module 13, an input module 14, a CPU 15 and a display module 16 are interconnected via a bus.

The auxiliary storage device 11 is a nonvolatile storage device which is readable/writable from the CPU 15, and, for instance, a hard disk drive or the like is usable. In addition, various programs such as a communication management module (communication management program) 100 and a client application 200, which are to be described later, are stored in the auxiliary storage device 11.

The main storage device 12 is a storage device which is readable/writable from the CPU 15, and, for instance, a RAM (Random Access Memory) or the like is usable. In addition, before execution of programs, the communication management module 100 and client application 200 are read out from the auxiliary storage device 11 and stored in the main storage device 12.

The communication module 13 is a communication interface device between the inside of the mobile apparatus 10 and a wireless network, and, for instance, a wireless communication apparatus or the like is usable.

The input module 14 is a device which inputs various pieces of data and instructions to the mobile apparatus 10 by a user operation, and, for instance, a keyboard or a touch panel is usable.

The CPU 15 includes a function of accessing the respective components 11 to 14 and 16, and, mainly, a function of reading out programs from the auxiliary storage device 11 and writing them in the main storage device before program execution, and a function of executing various programs in the main storage device 12.

The display module 16 is a device which displays screen data received from the CPU 15 that is executing the communication management module 100 and client application 200, and, for instance, a liquid crystal display device or the like is usable.

Next, a description is given of various programs, such as the communication management module (communication management program) 100 and client application (client application program) 200, which are stored in the main storage device 12 and are executed by the CPU 15.

The communication management module 100 is a program for executing client-server communication. The client application 200 is a program for individually executing a plurality of individual processes using a communication process for communication with the server application, and a substitute process which is substituted for each individual process and makes no use of the communication process.

Specifically, the communication management module 100 includes a communication component management module 110, a communication pattern management module 120, a communication pattern setup module 130, a communication mode setup module 140, a communication pattern determination module 150, a component attribute setup module 160, a component attribute determination module 170, and a communication execution module 180.

In this case, the communication component management module 110 is a program of a part which manages communication components into which the communication process is segmentalized. FIG. 2 illustrates examples of information managed by the communication component management module 110. For example, it is assumed that there are a series of communication processes, namely, "standby from transmission of a request to a server application to reception of a response (synchronous communication process), retransmission of a request in case of a communication error (retry process), and display by a dialogue, etc., on a screen about the occurrence of a communication error in a case where a communication error still occurs (communication error display)" (incidentally, there are a plurality of kinds of this series of communication processes; the kinds of communication processes are classified as communication patterns).

The above-described series of communication processes comprising the synchronous communication process, retry process and communication error display can be successively executed by using three communication components, namely "synchronous communication processor", "retry processor" and "communication error notification module". The communication components, which execute partial processes constituting the communication process, are managed by the communication component management module 110.

Specifically, the communication component management module 110 is a program for causing the mobile apparatus 10 to function as communication component management device which stores communication components that are distinguishable by communication component names, namely the communication components (synchronous communication processor, asynchronous communication processor, retry processor and communication error notification module) for individually executing one or more partial processes constituting the communication process, and a communication component (local service call module) for calling and executing a substitute process. In the meantime, the "communication component management device which stores communication components" may be read as "program code for causing the CPU 15 to execute a process of writing the respective communication components in a communication component management area in the main storage device 12".

In the meantime, the synchronous communication processor is a communication component which has an attribute "execution service name," and is configured to execute a process of transmitting a request for executing a service of the server application and waiting until a response is returned.

The asynchronous communication processor is a communication component which has an attribute "execution service name," and is configured to execute a process of transmitting a request for executing a service of the server application, without waiting for a response.

The retry processor is a communication component which has attributes "retry number" and "retry interval", and is configured to execute a process of retransmission (retry) in a case where communication has failed.

The communication error notification module is a communication component which has attributes "error communication method" and "error message", and is configured to execute a process of notifying the user of the occurrence of an error when communication has failed.

The local service call module is a communication component for calling, instead of executing an individual process of the client application while communicating with the server application, a substitute process with the same process name as the process name of this individual process from the client application 200 and executing the substitute process, without communicating with the server application.

The communication pattern management module 120 is a program for managing communication patterns which are used in the client application 200 (incidentally, a combination of communication components is called "communication pattern"). In this case, the communication pattern, which is used in the client application, is accompanied with a name (communication pattern name) and registered in the communication pattern management module 120. FIG. 3 and FIG. 4 illustrate tables of communication patterns. For example, a combination of "synchronous communication processor", "retry processor" and "communication error notification module" is registered in the communication pattern management module 120, with the communication pattern name "synchronous retry remote pattern".

Specifically, as illustrated in FIG. 5, the communication pattern management module 120 is a program for causing the mobile apparatus 10 to function as communication pattern management device which mutually associates and stores, with respect to each communication pattern name identifying a communication pattern indicative of a combination of communication components, the communication component name identifying each communication component used in this combination and the order of execution of each communication component. Incidentally, "communication pattern management device which mutually associates and stores . . . " may be read as "program code for causing the CPU 15 to execute a process of mutually associating and writing . . . in a communication pattern management area in the main storage device 12".

The communication pattern setup module 130 is a program of a part which sets up a communication pattern which is used at a time when the client application 200 communicates. The setup of a communication pattern includes two setups, namely an initial setup and an individual setup. The initial setup is a setup which is set for the whole communication process of the client application 200. The individual setup is a setup which is executed for each communication process when a communication pattern, which is different from the initial setup, is used for a specific communication process. For example, in a case where "synchronous remote pattern" has been set as an initial setup and "synchronous retry remote pattern" has been set as an individual setup for a search process in an application which executes individual processes 201, 202, 203, . . . of search, registration, update and delete, the "synchronous retry remote pattern" is applied to the communication of the search process, and the "synchronous remote pattern" of the initial setup is applied to the communication of registration, update and delete.

Figure 6:
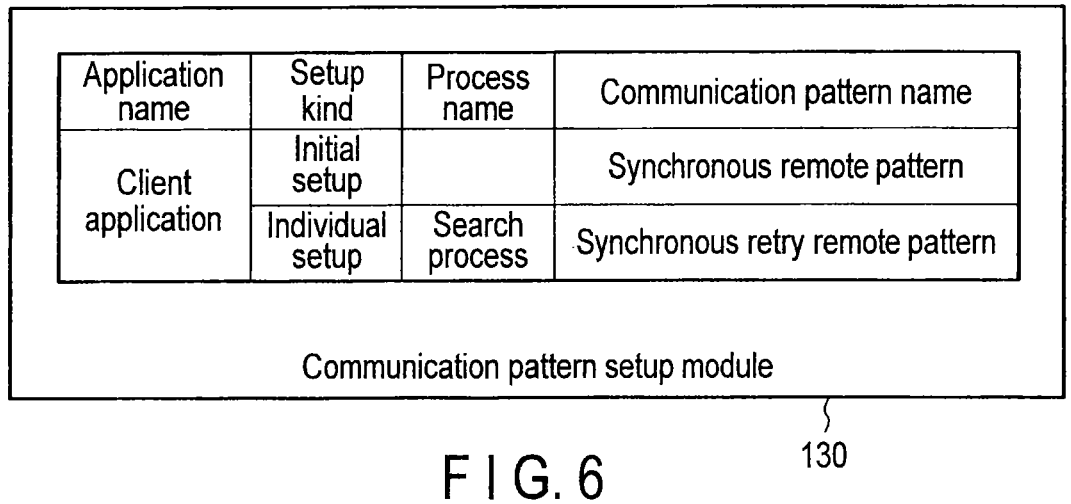
FIG. 6 is a schematic view for describing a communication pattern setup module in the embodiment.

Specifically, as illustrated in FIG. 6, the communication pattern setup module 130 is a program for causing the mobile apparatus 10 to function as communication pattern setup device which mutually associates and sets up, with respect to each application name identifying the client application 200, the process name identifying the individual process 201, 202, 203, . . . (in the client application 200), the communication pattern name, and the setup kind which identifies the initial setup or the individual setup. The "communication pattern setup device which mutually associates and sets up . . . " may be read as "program code for causing the CPU 15 to execute a process of mutually associating and setting up . . . in a communication pattern setup area in the main storage device 12". Incidentally, the client application 200 is a client application program for individually executing a plurality of individual processes 201, 202, 203, . . . by the mobile apparatus (client apparatus) 10 in the client-server system, and a substitute process (not shown) which is substituted for each individual process and makes no use of the communication process.

The communication mode setup module 140 is a program of a part which sets up either an operation mode or a test mode for the client application 200. In the case of the operation mode, communication is executed according to the setup of the communication pattern setup module 130. In the case of the test mode, the setup of the communication pattern setup module 130 is ignored, and "local pattern" (a pattern in which a substitute process existing in the client application 200 is executed without communicating with the server application) is applied to the whole communication process. The communication mode setup module 140 may be set in the test mode, in a case where the communication with the server application is to be temporarily stopped because of, for example, a test of the client application 200.

Figure 7:
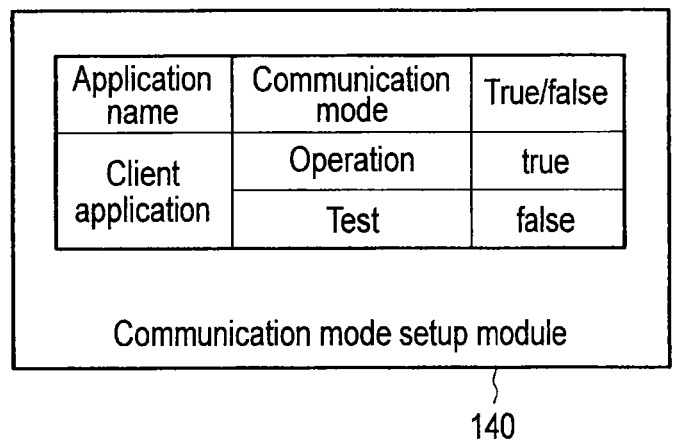
FIG. 7 is a schematic view for describing a communication mode setup module in the embodiment.

Specifically, as illustrated in FIG. 7, the communication mode setup module 140 is a program for causing the mobile apparatus 10 to function as communication mode setup device which sets up, with respect to each application name of the client application 200, the operation mode for executing the communication process in accordance with the individual process 201, 202, 203, . . . , or the test mode for executing the substitute process (not shown) without executing the communication process. Incidentally, "communication mode setup device which sets up . . . " may be read as "program code for causing the CPU 15 to execute a process of setting up . . . in a communication mode setup area in the main storage device 12".

The communication pattern determination module 150 is a program of a part which determines a communication pattern that is to be used for communication, by referring to the setup of the communication pattern setup module 130 and communication mode setup module 140. For example, when communication of a search process is executed, "local pattern" is determined if the communication mode setup module 140 is referred to and the test mode is set up. If the operation mode is set up, the individual setup of the communication pattern setup module 130 is referred to. If the communication pattern of the search process is set up, this communication pattern is determined. If the communication pattern of the search process is not set up for the individual setup, the communication pattern of the initial setup is determined.

Specifically, the communication pattern determination module 150 is a program for causing the mobile apparatus 10 to function as communication pattern determination device which determines the communication pattern name identifying the communication pattern to be a predetermined communication pattern name representative of the local pattern if the test mode is set up in the communication mode setup module 140, and for determining the communication pattern name identifying the communication pattern to be a communication pattern name that is set up in communication pattern setup module 130 if the operation mode is set up in the communication mode setup module 140.

The component attribute setup module 160 is a program of a part which sets up attributes of the respective communication components which are managed by the communication component management module 110. The attributes determine the behaviors of the communication components. For example, the "retry processor" has attributes which set up the number of times of retry and the interval of retries. Like the communication pattern, each attribute can be set in two modes, i.e., initial setup and individual setup. For example, when "5" is to be set for the retry number in the communication of the search process and "1" is to be set for the retry number in the other communication, "1" is set for the retry number in the initial setup and "5" is set for the retry number of the search process in the individual setup.

Specifically, as illustrated in FIG. 8, the component attribute setup module 160 is a program for causing the mobile apparatus 10 to function as component attribute setup device which mutually associates and sets up, with respect to each communication component name, the kind of setup, the process name and the attribute indicative of the setup of the operation in the partial process. Incidentally, "component attribute setup device which mutually associates and sets up . . . " may be read as "program code for causing the CPU 15 to execute a process of mutually associating and setting up . . . in a component attribute setup area in the main storage device 12".

The component attribute determination module 170 is a program of a part which determines the attribute of the communication component used for communication, by referring to the setup of the component attribute setup module 160. For example, when the search process uses the "retry processor" that is the communication component, it is checked whether the setup of the search process is present as the individual setup of the component attribute setup module 160. If the setup of the search process is present, this setup is determined to be the attribute of this component. If the setup of the search process is absent, the initial setup is determined to be the attribute of this component.

Specifically, the component attribute determination module 170 is a program for causing the mobile apparatus 10 to function as component attribute determination device which refers to, when the individual process 201, 202, 203, . . . , which is being executed, uses a communication component, the component attribute setup module 160, based on the communication component name identifying this communication component and the process name identifying this individual process 201, 202, 203, . . . , for determining, when the process name associated with the communication component name and the individual setup of the setup kind in the component attribute setup module 160 agrees with the process name identifying the individual process 201, 202, 203, . . . , that the attribute associated with the individual setup is the attribute of the communication component, and for determining, in cases other than the case of the agreement, that the attribute associated with the communication component name and the initial setup of the setup kind in the component attribute setup module 160 is the attribute of the communication component.

The communication execution module 180 is a program for causing the mobile apparatus 10 to realize a function of determining a communication pattern to be used, by the communication pattern determination module 150, and checking which communication components are used in which order by the corresponding communication pattern of the communication pattern management module 120, and a function of taking out the communication components to be used from the communication component management module 110, setting up for the communication components the attributes of the communication components determined by the component attribute determination module 170, and executing the communication components according to the communication pattern.

Specifically, the communication execution module 180 is a program for causing the mobile apparatus 10 to function as communication execution device which acquires from the communication pattern management module 120 the communication component names and the order associated with the communication pattern name determined by the communication pattern determination module 150, acquiring the communication components identified by the acquired communication component names from the communication component management module 110, setting up the attributes determined by the component attribute setup module 170 for the acquired communication components, and executing the communication components, for which the attributes have been set up, in the acquired order.

The client application 200 is a client application program for executing a plurality of individual processes 201, 202, 203, . . . , by the mobile apparatus 10 serving as the client apparatus in the client-server system.

Figure 9:
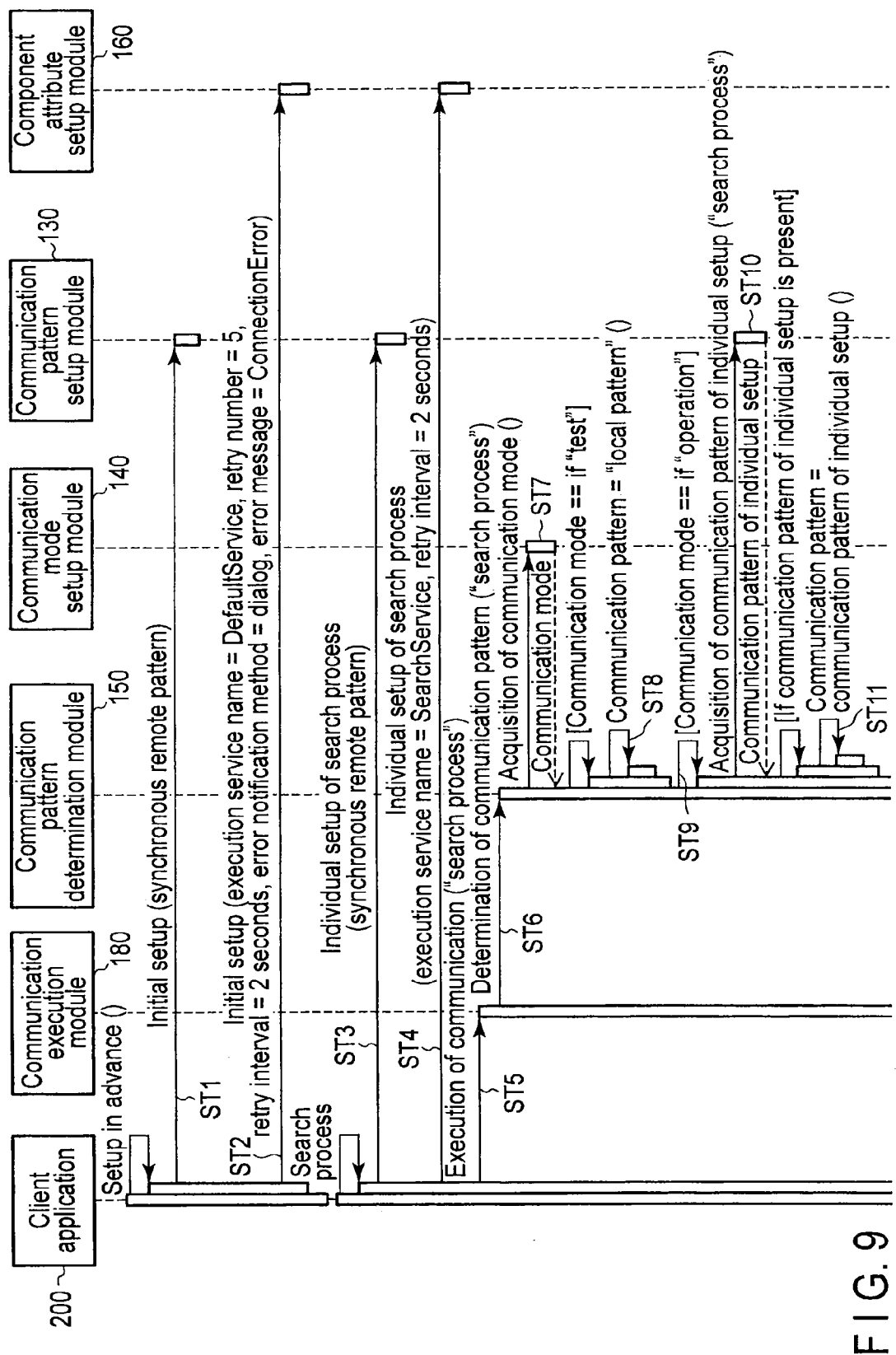
FIG. 9 is a sequence chart for describing an operation in the embodiment.
Figure 10:
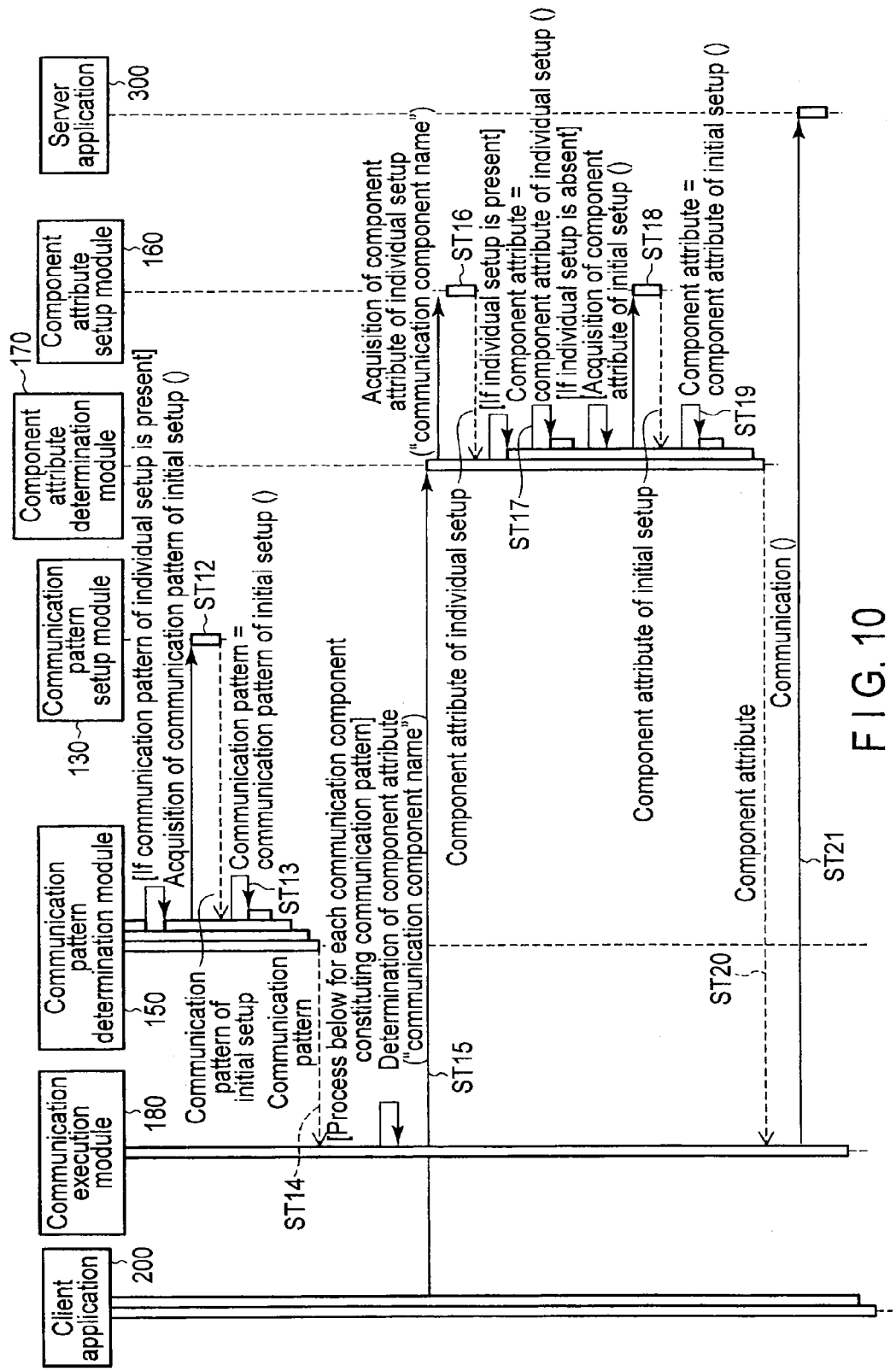
FIG. 10 is a sequence chart for describing an operation in the embodiment.

Next, referring to sequence charts of FIG. 9 and FIG. 10, the operation of the mobile apparatus with the above-described configuration is described. Incidentally, the communication component management module 110 and communication pattern management module 120 are provided in advance in the communication management module (communication management program) 100.

In the mobile apparatus 10, it is assumed that the CPU 15 activates the communication management module 100 and client application 200. On the other hand, in the server apparatus (not shown), it is assumed that the CPU is executing a server application 300.

In this case, in the mobile apparatus 10, the CPU 15 executes a process at a time of activating the client application 200 and communication management module 100. In the process that is executed at the time of activating the application, the CPU 15 executes in advance the initial setup relating to communication (ST1 to ST2).

Specifically, the CPU 15 of the mobile apparatus 10 initially sets up the communication pattern in the communication pattern setup module 130, based on an operation of the input module 14 by the user, for example, in accordance with an initial setup instruction including "synchronous remote pattern" (ST1). Thereby, in the communication pattern setup module 130, with respect to each application name of the client application 200, the process name of the individual process, the communication pattern name and the setup kind, which identifies the initial setup, are associated and set up. The initially set-up communication pattern is the default, and is applied to the whole communication process with no individual setup, unless the communication mode is "test".

In addition, the CPU 15 initially sets up the attributes of communication components in the component attribute setup module 170, based on an operation of the input module 14 by the user, in accordance with an initial setup instruction including attributes of communication components (ST2). Thereby, in the component attribute setup module 160, with respect to each communication component name, the initial setup of the setup kind, the process name, and the attribute (also referred to as "component attribute") indicative of the setup of the operation in the partial process are associated and set up. The set-up component attribute is the default, and is applied to the whole communication process with no individual setup. A setup example of the component attributes is as follows:

[Execution service name=DefaultService, retry number=5, retry interval=2 seconds, error notification method=dialog, error message=ConnectionError!]

By the above, the initial setup relating to the communication is completed.

A supplementary description is now given of the communication mode setup ("test"). When the client application 200 alone is to be operated without communication with the server apparatus which executes the server application 300, a test mode is set in the communication mode setup module 140. When normal communication is desired, the default operation mode may be executed, so the setup of the test mode is needless. In any case, the operation mode or the test mode is set up in the communication mode setup module 140 with respect to each application name of the client application 200.

Next, a description is given of an operation of executing communication of the search process as the individual process 202, as an example of use from the client application 200.

To begin with, when a communication pattern, which is not the communication pattern that has been initially set up in step ST1, is used, the CPU 15 individually sets up the communication pattern in the communication pattern setup module 130 by the operation of the input module 14 by the user (ST3). Thereby, in the communication pattern setup module 130, with respect to each application name of the client application 200, the process name of the individual process, the communication pattern name and the setup kind, which identifies the individual setup, are associated and set up. When the initially set-up communication pattern is used, the process of step ST3 is needless.

In addition, when an attribute, which is not the attribute initially set in step ST2, is used, the CPU 15 individually sets up the attribute in the component attribute setup module 160 by the operation of the input module 14 by the user (ST4). For example, in the case where the component attribute "retry number", which is the component attribute of the "retry processor" that is one of the communication components, is initially set up as "2" in step S2 and the "retry number" of only the communication of the search process is to be set at "5", the individual setup is executed in step ST4. Thereby, in the component attribute setup module 160, with respect to each communication component name, the individual setup of the setup kind, the process name, and the attribute indicative of the setup of the operation in the partial process are associated and set up. When the initially set-up attributes are used, the process of step ST4 is needless.

Next, based on the execution of the individual process (search process) 202 in the client application 200, the CPU 15 executes the communication execution module 180 at a timing at which communication is to be executed, in accordance with a communication execution instruction including "search process" (ST5). Thereby, the communication process of the mobile apparatus 10 is started.

Based on the execution of the communication execution module 180, the CPU 15 executes the communication pattern determination module 150 in accordance with a communication pattern determination instruction including "search process" (ST6).

Thereafter, based on the execution of the communication pattern determination module 150, the CPU 15 determines which communication pattern is to be used for executing communication, and returns the communication pattern name, which is obtained as a result of determination, to the communication execution module 180 (ST7 to ST14).

Specifically, based on the execution of the communication pattern determination module 150, the CPU 15 determines that the communication pattern name, which identifies the communication pattern, is a predetermined communication pattern name representative of the local pattern, if the test mode is set in the communication mode setup module 140 (ST7, ST8), and determines that the communication pattern name, which identifies the communication pattern, is a communication pattern name which is set up in the communication pattern setup module 130, if the operation mode is set in the communication mode setup module 140 (ST9 to ST13).

For example, based on the execution of the communication pattern determination module 150, the CPU 15 acquires the communication mode from the communication mode setup module 140 (ST7). In this case, if the communication mode is "test", the CPU 15 sets the "local pattern", which executes the local service without executing communication, to be a determination result (ST8).

On the other hand, if the communication mode is "operation" (ST9), the CPU 15 next confirms whether there is a communication pattern of individual setup from the communication pattern setup module 130 (ST10). In this example, if there is a communication pattern of individual setup corresponding to the search process, the communication pattern name of individual setup is set to be a determination result (ST11).

If there is no communication pattern name of individual setup, the CPU 15 acquires a communication pattern name of the initial setup from the communication pattern setup module 130 (ST12), and sets the communication pattern name of the initial setup to be a determination result (ST13).

The CPU 15 returns the communication pattern name, which is the determination result in step ST8, ST11 or ST13, to the communication execution module 180 (ST14).

Next, based on the execution of the communication execution module 180, the CPU 15 acquires from the communication pattern management module 120 the communication component names and the order associated with the communication pattern name obtained by step ST14, and acquires the communication components identified by the acquired communication component names from the communication component management module 110.

Thereafter, the CPU 15 repeatedly executes the process of the following steps ST15 to ST20, with respect to each of the communication components constituting the communication pattern of the communication pattern name acquired in step ST14.

For example, based on the execution of the communication execution module 180, the CPU 15 executes the component attribute determination module 170 in accordance with a component attribute determination instruction including the "communication component name" (ST15).

Thereby, based on the execution of the component attribute determination module 170, the CPU 15 refers to, when the individual process 202, which is being executed, uses a communication component, the component attribute setup module 160, based on the communication component name identifying this communication component and the process name identifying this individual process 202. When the process name associated with the communication component name and the individual setup of the setup kind in the component attribute setup module 160 agrees with the process name identifying the individual process 202, the CPU 15 determines that the attribute associated with the individual setup is the attribute of the communication component (ST16, ST17). In cases other than the case of the agreement, the CPU 15 determines that the attribute associated with the communication component name and the initial setup of the setup kind in the component attribute setup module 160 is the attribute of the communication component (ST18, ST19).

For example, based on the execution of the component attribute determination module 170, the CPU 15 first confirms whether there is individual setup from the component attribute setup module 160 with respect to each attribute (ST16). If there is individual setup, the component attribute associated with this individual setup is set to be a determination result (ST17).

On the other hand, if there is no individual setup, the CPU 15 acquires the component attribute of the initial setup from the component attribute setup module 160, based on the execution of the component attribute determination module 170 (ST18), and sets the component attribute of the initial setup to be a determination result (ST19).

Thereafter, the CPU 15 returns the component attribute, which has been obtained as the determination result in step ST17 or ST19, to the communication execution module 180 (ST20).

Thereby, for example, when the communication pattern of the search process is the "synchronous remote pattern" including the "synchronous communication processor" and "communication error notification module" as communication components, the CPU 15 acquires, as illustrated in FIG. 2, three attribute values, namely the "execution service name" attribute that is the component attribute of the "synchronous communication processor", and the "error notification method" attribute and "error message" attribute that are the component attributes of the "communication error notification module".

Thereby, the CPU 15 sets the attributes, which have been obtained in steps ST15 to ST20, for the communication components acquired after step ST14, and executes the communication components, for which the attributes have been set, in the order of the acquisition.

For example, in the case of the operation mode, the CPU 15 communicates, by the execution of the communication execution module 180, with the server apparatus (not shown) which executes the server application 300, by using the communication pattern name acquired by step ST14 and the component attributes constituting the communication pattern of the communication pattern (ST21).

On the other hand, in the case of the test mode, by the execution of the communication execution module 180, the CPU 15 calls and executes the substitute process (local service) in the client application 200, without communicating with the server apparatus, by using the communication pattern name (local pattern) acquired by step ST14 and the communication component (local service call module) constituting the communication pattern of this communication pattern.

As has been described above, according to the present embodiment, the operation mode of executing the communication process in accordance with the individual process, or the test mode of executing the substitute process is set up. If the test mode is set up, the predetermined communication pattern name representative of the local pattern is determined, the communication component names associated with the determined communication pattern name and the order are acquired, and the communication components are executed in order. By this configuration, while the degradation in productivity and quality is prevented, the communication mode can be switched, and the operation confirmation of the client application can be executed in the state in which the server application is absent.

If a supplementary description is added, since the developer of the client application can implement the communication process by simply selecting and executing the communication pattern provided by the mobile apparatus 10, there is no need to individually implement an offline process.

In addition, by providing the function of setting up the communication (e.g., what message is to be displayed in the case of a communication error, or how many times retry is executed in the case of a communication error) in the two stages of initial setup and individual setup, the developer can reduce the number of setup items to a minimum.

Furthermore, there is provided the function of switching the communication mode such that the substitute process existing in the client is executed for the whole communication process without communicating with the server application, regardless of the initial/individual setup. Thereby, when a test is to be executed by the client application alone at a stage when the server application is incomplete, this test can be executed by simply switching the communication mode.

The method described in each embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to each embodiment includes not only a medium independent of a computer but also a storage medium in which a program transmitted through a LAN, the Internet, or the like is downloaded and stored or temporarily stored.

The number of storage media is not limited to one. A case in which the process in each embodiment is executed from a plurality of media is included in the storage medium according to the present invention. Any medium configuration may be used.

A computer according to each embodiment is to execute the processes in each embodiment on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A non-transitory computer-readable medium storing computer-readable instructions thereon which when read by processing circuitry of a client apparatus having a storage device storing a client application program for individually executing a plurality of individual processes using a communication process in a client-server system composed of the client apparatus and configured to execute the communication process by radio and a server apparatus, and a substitute process which is substituted for each of the individual processes and makes no use of the communication process, causes the processing circuitry to execute a communication management program comprising:

writing communication components, which are distinguishable by communication component names, in a communication component management area in the storage device, the communication components including communication components for individually executing one or more partial processes constituting the communication process, and a communication component for calling and executing the substitute process;

mutually associating, with respect to each of communication pattern names identifying communication patterns indicative of a combination of the communication components, the communication component name identifying each of the communication components used in the combination and an order of execution of the communication components, and writing the communication component name and the order in a communication pattern management area in the storage device;

mutually associating, with respect to each of application names identifying the client application program, a process name identifying the individual process, the communication pattern name and a setup kind identifying initial setup or individual setup, and setting up the process name, the communication pattern name and the setup kind in a communication pattern setup area in the storage device;

setting up, with respect to each of the application names, an operation mode for executing the communication process in accordance with the individual process or a test mode for executing the substitute process in a communication mode setup area in the storage device;

executing a first determination process of determining the communication pattern name identifying the communication pattern to be a predetermined communication pattern name representative of a local pattern if the test mode is set up in the communication mode setup area, and determining the communication pattern name identifying the communication pattern to be the communication pattern name that is set up in the communication pattern setup area if the operation mode is set up in the communication mode setup area;

mutually associating, with respect to each of the communication component names, the setup kind, the process name and an attribute indicative of setup of an operation in the partial process, and setting up the setup kind, the process name and the attribute in a component attribute setup area in the storage device;

executing a second determination process of referring to, when the individual process, which is being executed, uses a communication component, the component attribute setup area, based on the communication component name identifying the communication component and the process name identifying the individual process, determining, when the process name associated with the communication component name and the individual setup of the setup kind in the component attribute setup area agrees with the process name identifying the individual process, that the attribute associated with the individual setup is the attribute of the communication component, and determining, in cases other than a case of the agreement, that the attribute associated with the communication component name and the initial setup of the setup kind in the component attribute setup area is the attribute of the communication component; and acquiring from the communication pattern management area the communication component names and the order associated with the communication pattern name determined by the first determination process, acquiring the communication components identified by the acquired communication component names from the communication component management area, setting up the attributes determined by the second determination process for the acquired communication components, and executing the communication components, for which the attributes have been set up, in the acquired order.

2. A client apparatus configured to execute a communication process by radio with a server apparatus of a client-server system, the client apparatus comprising:

a storage device configured to store a client application program executed by a processing circuitry for individually executing a plurality of individual processes using the communication process, and a substitute process which is substituted for each of the individual processes and makes no use of the communication process;

a communication component management device which stores communication components which are distinguishable by communication component names, the communication components including communication components for individually executing one or more partial processes constituting the communication process, and a communication component for calling and executing the substitute process;

a communication pattern management device which mutually associates and stores, with respect to each of communication pattern names identifying communication patterns indicative of a combination of the communication components, the communication component name identifying each of the communication components used in the combination and an order of execution of the communication components;

a communication pattern setup device which mutually associates and sets up, with respect to each of application names identifying the client application program, a process name identifying the individual process, the communication pattern name and a setup kind identifying initial setup or individual setup;

a communication mode setup device which sets up, with respect to each of the application names, an operation mode for executing the communication process in accordance with the individual process or a test mode for executing the substitute process;

a communication pattern determination device which determines the communication pattern name identifying the communication pattern to be a predetermined communication pattern name representative of a local pattern if the test mode is set up in the communication mode setup device, and determines the communication pattern name identifying the communication pattern to be the communication pattern name that is set up in communication pattern setup device if the operation mode is set up in the communication mode setup device;

a component attribute setup device which mutually associates and sets up, with respect to each of the communication component names, the setup kind, the process name and an attribute indicative of setup of an operation in the partial process;

a component attribute determination device which refers to, when the individual process, which is being executed, uses a communication component, the component attribute setup device, based on the communication component name identifying the communication component and the process name identifying the individual process, determines, when the process name associated with the communication component name and the individual setup of the setup kind in the component attribute setup device agrees with the process name identifying the individual process, that the attribute associated with the individual setup is the attribute of the communication component, and determines, in cases other than a case of the agreement, that the attribute associated with the communication component name and the initial setup of the setup kind in the component attribute setup device is the attribute of the communication component; and a communication execution device which acquires from the communication pattern management device the communication component names and the order associated with the communication pattern name determined by the communication pattern determination device, acquires the communication components identified by the acquired communication component names from the communication component management device, sets up the attributes determined by the component attribute determination device for the acquired communication components, and executes the communication components, for which the attributes have been set up, in the acquired order, wherein the communication component management device, the communication pattern management device, the communication pattern setup device, the communication mode setup device, the communication pattern determination device, the component attribute setup device, the component attribute determination device, and the communication execution device are executed by the processing circuitry.

* * * * *